Dec. 18, 1951      M. BESSONNEAU      2,578,990
HOLD DOWN AND LINKAGE ASSEMBLY
FOR CONVERTIBLE TOPS
Filed Aug. 23, 1946      5 Sheets-Sheet 1
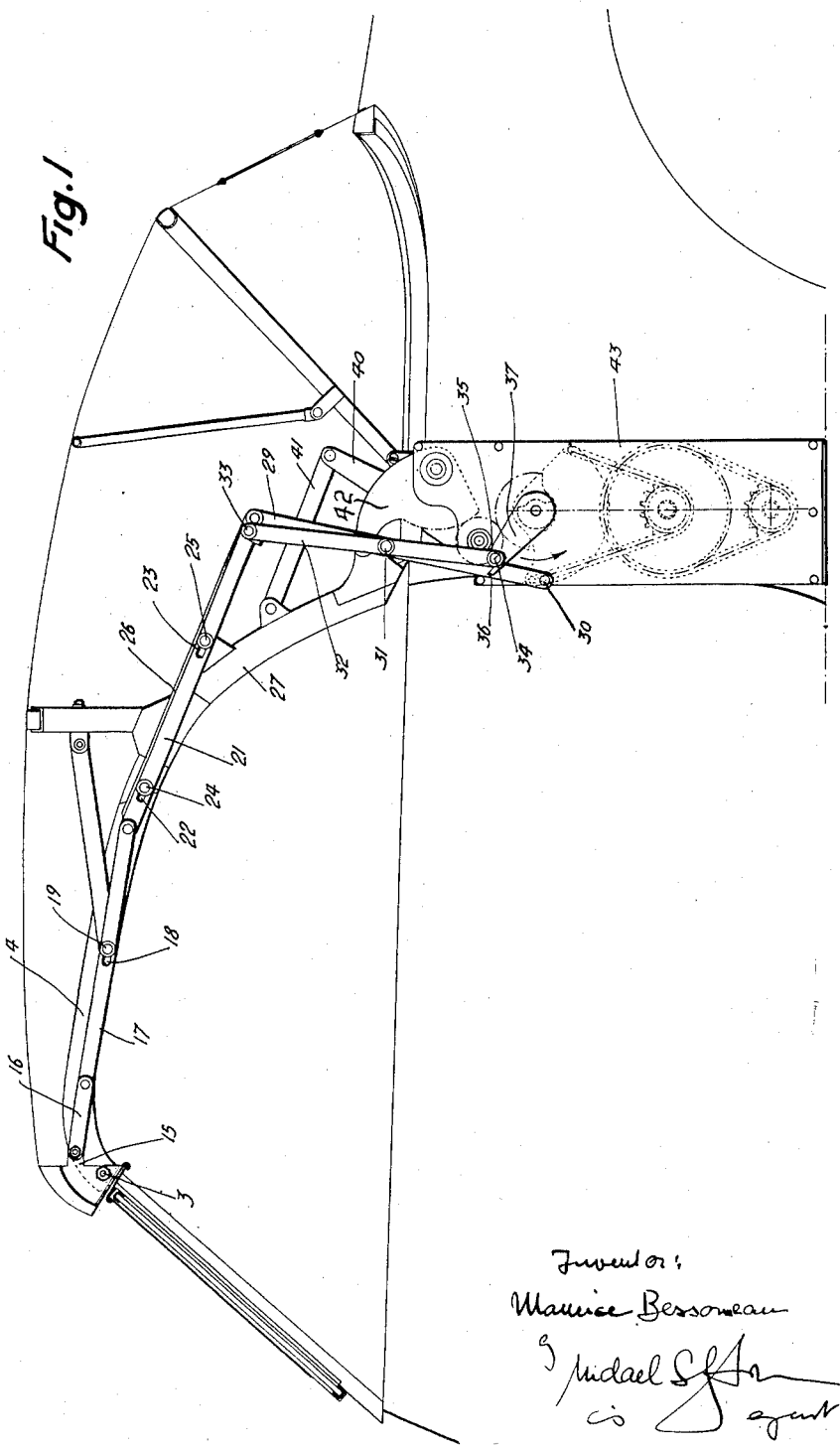

Dec. 18, 1951    M. BESSONNEAU    2,578,990
HOLD DOWN AND LINKAGE ASSEMBLY
FOR CONVERTIBLE TOPS
Filed Aug. 23, 1946    5 Sheets-Sheet 2
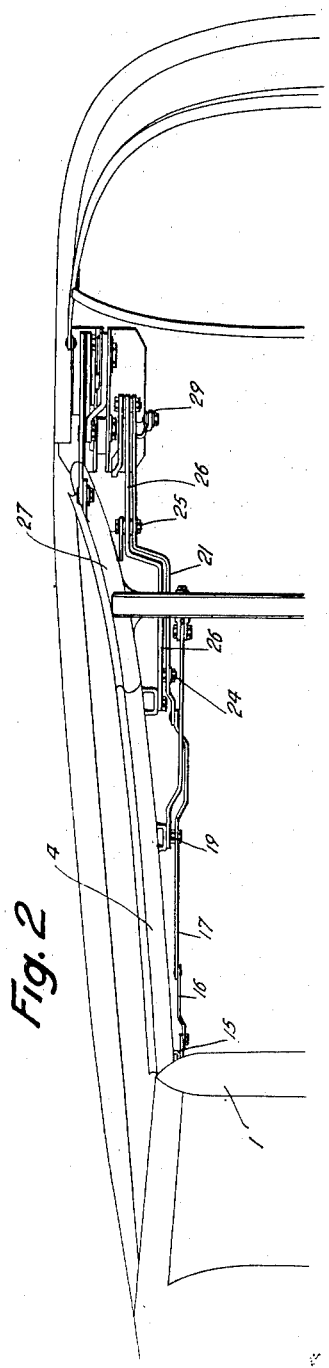
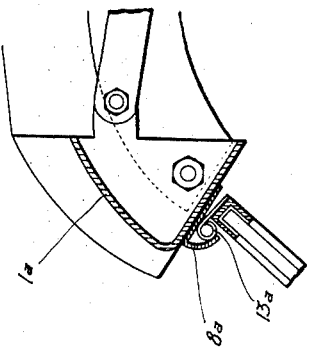

Dec. 18, 1951     M. BESSONNEAU     2,578,990
HOLD DOWN AND LINKAGE ASSEMBLY
FOR CONVERTIBLE TOPS
Filed Aug. 23, 1946     5 Sheets-Sheet 3
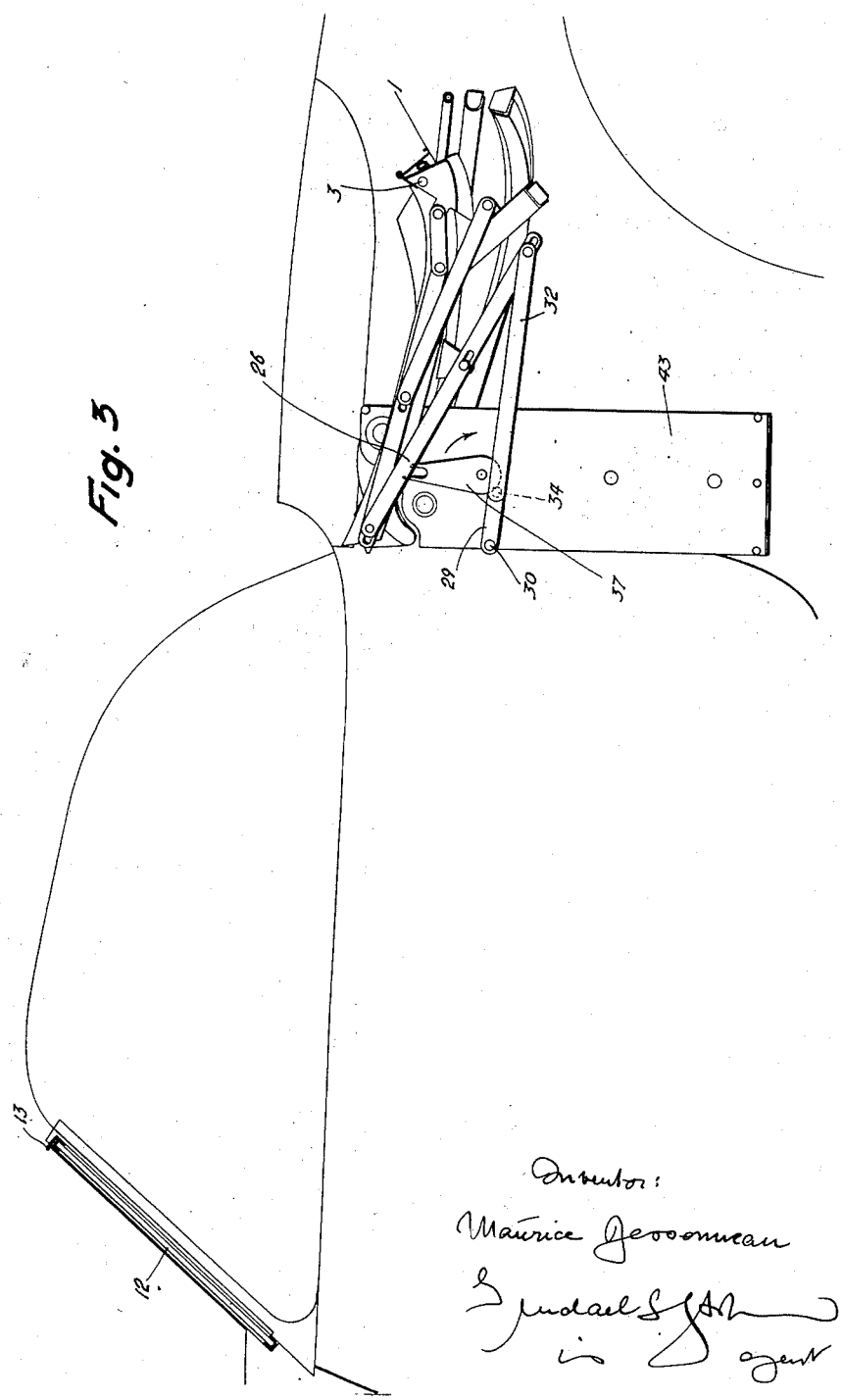

Dec. 18, 1951     M. BESSONNEAU     2,578,990
HOLD DOWN AND LINKAGE ASSEMBLY
FOR CONVERTIBLE TOPS

Filed Aug. 23, 1946     5 Sheets-Sheet 4

Inventor:
Maurice Bessonneau

Dec. 18, 1951     M. BESSONNEAU     2,578,990
HOLD DOWN AND LINKAGE ASSEMBLY
FOR CONVERTIBLE TOPS
Filed Aug. 23, 1946     5 Sheets-Sheet 5
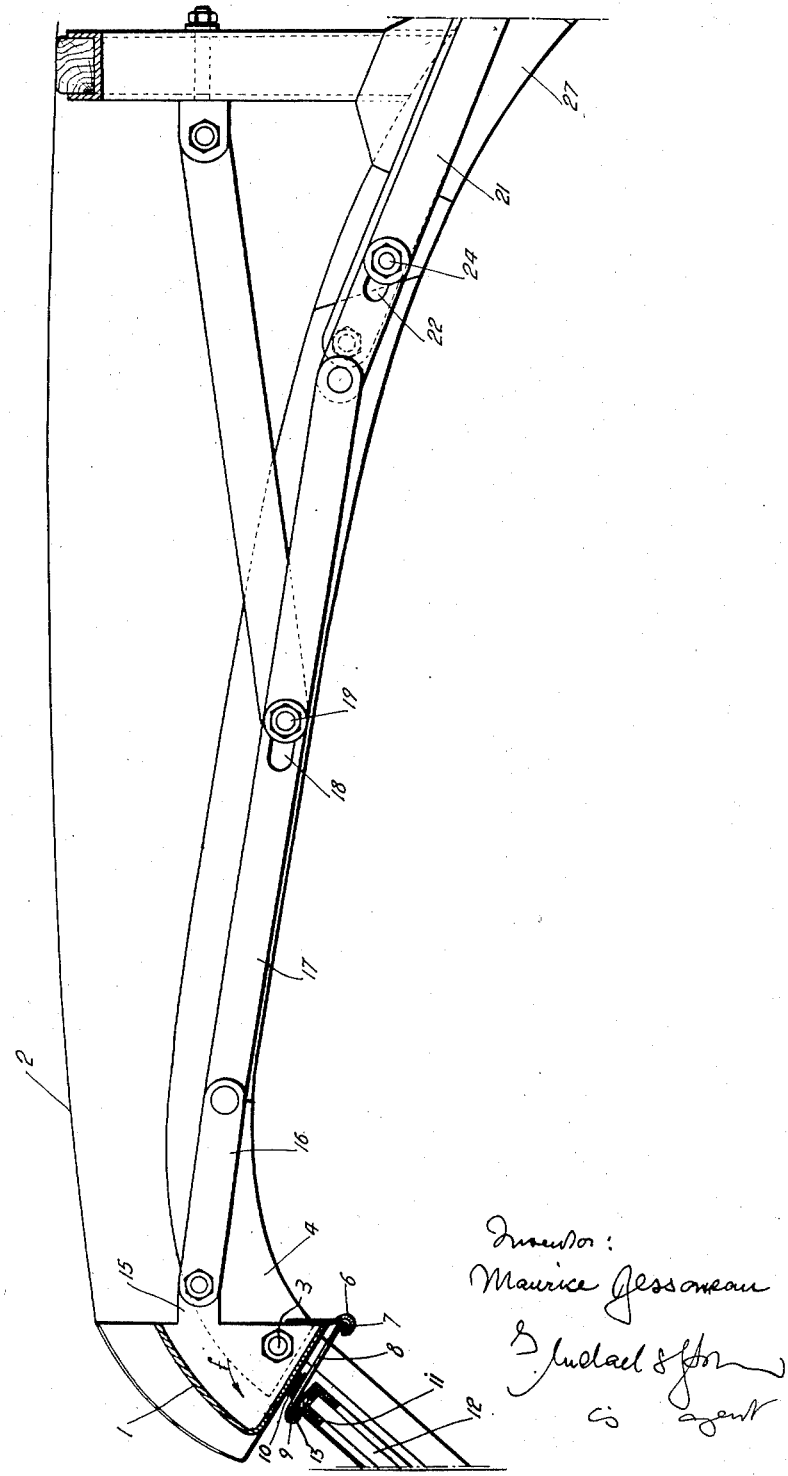

Patented Dec. 18, 1951

2,578,990

UNITED STATES PATENT OFFICE 2,578,990

HOLD-DOWN AND LINKAGE ASSEMBLY FOR CONVERTIBLE TOPS

Maurice Bessonneau, Puteaux, France

Application August 23, 1946, Serial No. 692,518
In France August 28, 1945

11 Claims. (Cl. 296—116)

My invention relates to collapsible top coverings as used in motor vehicles and elsewhere, of the type having their foremost edge to be fastened onto a supporting structure forming an abutment therefor when said covering top is fully extended, e. g. onto the windshield in the particular case of a top covering of a motor car.

More specifically my invention relates to the fastening means for said collapsible top coverings and its primary object is to provide a fastening device which will be strong, easy to operate and watertight.

A further object of my invention is to provide fastening means adapted for actuation through a contrivance, preferably from the driving means provided for actuation of the top covering.

A still further object of my invention is to provide for an automatic watertight fastening of the top covering onto the windshield or other abutment upon full extension of said top covering.

There are shown by way of example and by no means in a limitative manner in the accompanying drawings two embodiments of my invention as applied to a roadster.

In said drawings:

Fig. 1 is a partial side view of the vehicle with its top covering hooked onto the windshield.

Fig. 2 is a corresponding half plane view.

Fig. 3 is a partial side view of the vehicle of Fig. 1 with its top covering folded back.

Fig. 7 is a view at a larger scale of the pivoting bill shown in Fig. 1, and

Fig. 8 is a view of a modified embodiment of the bill fastening means, carried by the bill.

Figure 4:
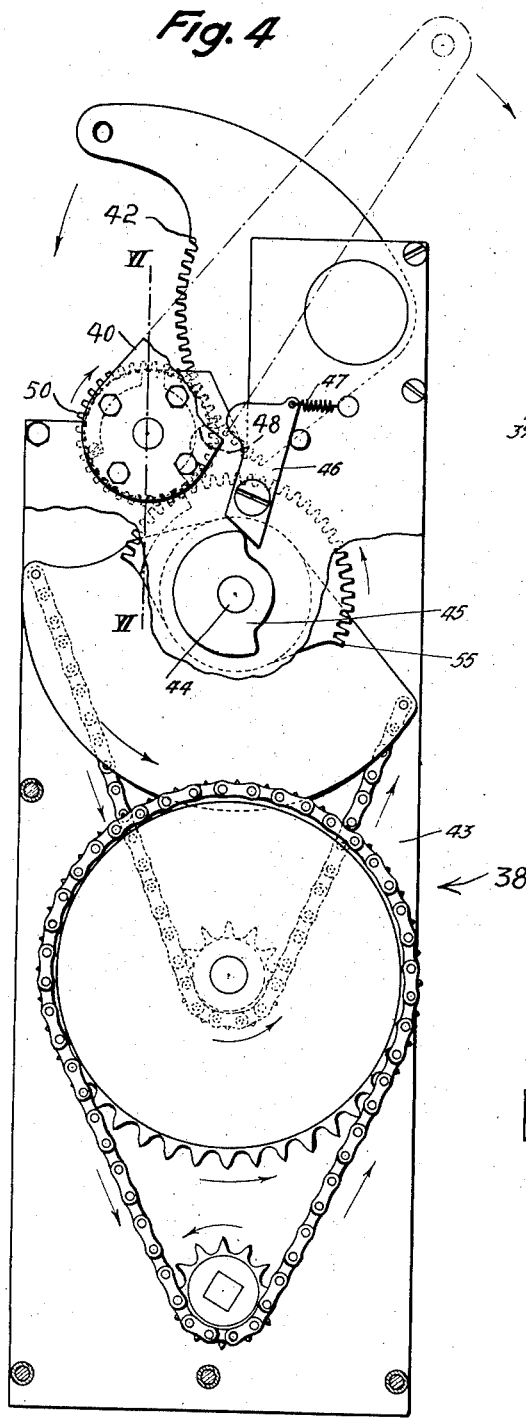
Fig. 4 shows at a larger scale the driving mechanism actuating the linkwork.

In the example of execution illustrated in Figs. 1 to 4, the bill 1 to which is secured the front portion of the top covering 2 is pivotally carried by two pivot pins 3 secured respectively to the front ends of the side members or side rails 4 of the armature of the top covering. At its lower end the bill carries a sort of gutter or hook 6 directed towards the front and extending throughout the length of said bill. Inside this gutter 6 is fitted the bead shaped rear edge 7 of a fastening member having the form of a small plate 8 the front edge 9 of which is hook-shaped along its whole length. The gutter 6 and the bead-shaped edge form together a hinge-connection and the small plate 8 is thus pivotally secured to the bill and may pivot to some extent with reference thereto. Between said plate 8 and the lower surface of the bill is moreover inserted a packing 10. On the other hand, to the upper end of the frame 11 of the windshield 12 is secured a bead-shaped fastening member 13 adapted to be capped by the hook-shaped edge of the fastening plate 8; said bead 13 projects slightly beyond the front surface of said windshield and extends throughout the length of the latter.

It is apparent that when the top covering 2 is fully extended, the bill 1 can be fastened onto the windshield 12 by causing said bill to pivot about its pivots 3 in the direction indicated by the arrow f. During this movement the hook 9 first engages the bead 13, then slides thereon from front to rear while slightly pivoting about the hinge 6, 7 and finally caps said bead 13 and is pressed against it, being in contact with said bead over fast one half of a circumference, whereby fluid-tightly fastening the top covering 2 on to the windshield 12.

At the same time the packing 10 is pressed between the lower surface of the bill and the upper surface of the fastening plate 8, which improves still more the watertightness already ensured through the contact of the hook 9 over the bead 13.

Figure 5:
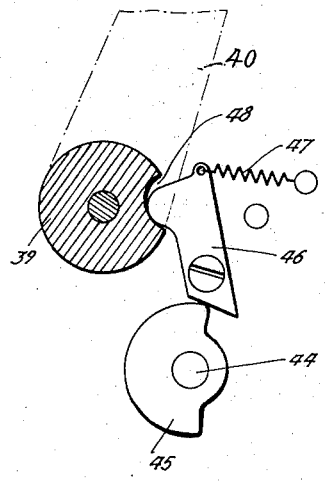
Fig. 5 is a view of a detail of the driving mechanism shown in a position which differs from that occupied in the case of Fig. 4.
Figure 6:
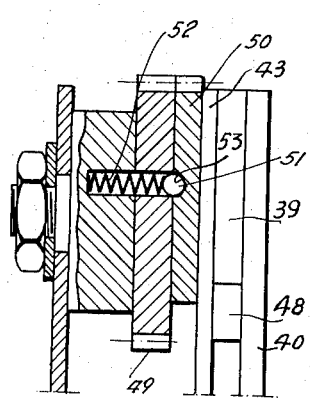
Fig. 6 is a partial cross-section through line VI—VI of Fig. 4.

For the control of the movable bill, there is provided (Figs. 1 to 7) a control device comprising two identical linkworks engaging it through its opposite ends and each of which is constituted in the following manner: To a lug 15 secured to one end of the bill and directed rearwardly is pivotally secured a link 16 pivoted on the other hand to the end of a rod or link 17 provided with an elongated slot 18 through which extends a pin 19 secured to the side rail 4; the rear end of the rod 17 is pivotally secured to a rod 21 provided with elongated slots 22—23 through which extend studs 24 and 25 secured to the top covering operating rod 26; said rod 26 forms part of the mechanism described in my prior patent specifications. The stud 24 is secured to the side rail 4 and the stud 25 to a side extension of the main or central bow 27. The rod 26 is linked to an arm 29 pivotally secured at 30 to the car body; to an intermediate point 31 of this arm 29 is pivoted an arm 32 the upper end of which is linked to the rod 21. The other end of the arm 32 carries a side pin 34 engaged in a fork 37 the prong 35 of which is shorter than the prong 36. Said fork 37 is secured on a pin 44 rotatably carried by a bracket 43 secured to the vehicle frame and is drivable from a motor not shown through a speed reducing gear transmission 38 the various members of which are carried by said bracket 43 and the last member secured to the pivot pin 44. To said pin 44 is also keyed a cam 45 controlling a latch 46 (Fig. 5); under the action of the cam, acting in antagonism with the return spring 47, this latch engages a notch 48 in a disc 39 made fast with an arm 40 pivotally carried by the bracket 43 and connected through a link 41 to the bow 27, thereby locking the arm 40 in the position of full extension of the armature of the top covering. The disc 39 provided with the notch 48 is fast with a wheel 49 having gear teeth (Fig. 6) extended but over a portion of a circle and in mesh with the toothed member 42 (Figs. 1 and 6) pivoted at the top of the bracket 43 and to the bow 27. The wheel 49 is coupled to a coaxial and loosely supported toothed wheel 50 by a ball 51 urged by a spring 52 into a recess 53 in said wheel 50, which has teeth extending over said portions of a circle where the wheel 49 has no teeth. Wheels 49 and 50 are arranged to be simultaneously in mesh, when coupled together, with a rockable toothed member 55 fast on the pin 44. It is thus apparent that, when the wheel 49 is locked by the latch 46, the transmission 38 may continue rotating without moving the arm 40 and the member 42 provided that at this moment the teeth 49 are no longer in mesh with the toothed member 55.

The operation is as follows:

The top covering being completely folded as shown in Fig. 3, the control motor is started through depression of a control knob carried by the dash-board and not illustrated. The motor drives the two transmissions 38 arranged to either side of the vehicle, and through the medium of the members 40 and 41 and the linkworks 26—29, moves the side rail 4 and the main bow 27 to the position illustrated in Fig. 1. At the moment at which the bill is about to engage the windshield, the teeth 49 escape from engagement with the toothed member 55 and the cam 45 continues acting on the latch 26 so as to make it engage the notch 48 in the wheel 39, thereby to prevent any undesired folding back of the top covering. The motor still rotating in the same direction, the ball 51 is forced out of the recess 53 and the wheel 50 rotates with reference to the teeth 49 which are held stationary by the latch 46. On the other hand, the longest prong 35 of the fork 37 engages the side projection 34 and causes the arm 32 to pivot about the pivot 31, which is now stationary by reason of the arm 29 being held against movement together with the whole top covering controlling mechanism by the locked sector 49. Consequently the rod 21 of the bill controlling linkwork slides over the rod or link 26 of the top covering controlling linkwork and causes the rod 17 to slide over the pin 19, thereby causing the bill 1 to pivot about the pivots 3 and providing for its hooking and for the tautening of the top canopy as described hereinabove. Once the hooking is provided for, the motor stops automatically through the action of a contact actuated by any of the movable members of the mechanism. The sliding movement of the rod 21 has also for its result a displacement of its pivotal connection 33 with reference to the pivotal connection of the rod 26 with the arm 29 and consequently any bending movement of the linkwork 17—21—32, or 26—29 becomes impossible; since the stud 25 common to both linkworks would have then to rotate around two different centers. For folding the top covering it is necessary to first return these two pivotal connections into alignment. To this end, the motor is caused to rotate in a direction opposed to that in which it rotates for unfolding the top covering and the prong 36 of the fork 47 meets the side pin 34 on the arm 32; it returns the latter backwards whereby the rod 26 is caused to slide over the rod 21 so as to return said pivotal connections into coincidence; this sliding has moreover as a result a rotation of the bill 1 about its pivots, 3, whereby unfastening said bill. At the same time, the toothed member 33 returns the wheel 50 backwards until the ball 51 reengages the recess 53 and makes the toothed sector 49 again rigid with said wheel 50; simultaneously the cam 45 returns backwards and releases the latch 46; the spring urging said catch moves it away from the sector 49 which is then allowed to take part in the rotation of the toothed members 55. The movement is from this moment onwards transmitted to the members 40 and 41 and the top covering is folded and returned into the position illustrated in Fig. 3. During this time and while the fork 37 rotates, the prong 36 on the latter has escaped from engagement with the projection 34 on the arm 32.

In the modification illustrated in Fig. 8, the lower face of the front end or bill 1a carries a small bar 8a fixed to the bill and the cross-section of which has the form of a hook open towards the rear and capable of engaging a bead 13a secured to the upper edge of the windshield and projecting slightly beyond the front surface of the latter.

Obviously my invention is by no means limited to the details of execution illustrated or described, which have been given out solely by way of example. Thus, for instance, it is applicable whatever may be the shape of the windshield whether rectilinear or of wind-cutting shape and also for fastening any top covering onto a supporting frame forming an abutment for the bill of said top covering.

What I claim is:

1. In the combination of means comprising an expansible jointed armature, a pliable protective covering carried thereby, a front bill to which is attached one end of said covering, an abutment adapted to be engaged by said bill when the armature is expanded, locking means respectively carried by said abutment and said bill and adapted when the top is expanded to lock said bill and abutment together, an actuating contrivance adapted to expand and retract said jointed armature, said bill being carried by said armature so as to be movable relatively thereto and thereby adapted to be brought into and out of locking position relatively to said abutment by being moved relatively to said armature, and means operatively connecting said bill to said contrivance and whereby the bill can be moved relatively to the armature by operation of said contrivance and thereby brought into and out of locking position, said means operatively connecting the bill to the contrivance including a linkwork the members of which are carried by said jointed armature and foldable therewith.

2. In the combination of a collapsible top covering including a jointed armature and a bill pivotally carried by said armature with means forming an abutment for said bill when said top covering is fully extended and with means for fastening said bill onto said abutment, said fastening means consisting of a bead provided on said abutment throughout the length of the latter and a channel member carried by the bill and also extended throughout the length of said bill and adapted to cap the front part of said bead and at least partly the underside thereof when the bill is rotated thereby locking the bill both vertically and horizontally.

3. In the combination as in claim 2, said channel member having a hook-shaped cross-section with the hook turned downwardly and rearwardly and the hook opening located forwardly of the bead and lower than the pivotal axis of said pivoted bill when said channel member is about to engage the bead.

4. In the combination as in claim 2, said channel member being hingedly connected to the bill, the channel proper being located forwardly of said connection.

5. In the combination as in claim 2, said channel member being so arranged as to be located forwardly of the bead when the top covering is extended to thereby engage the front part of said bead when moved to cap the latter.

6. In the combination as in claim 1, said jointed armature including a link pivoted to a rotatable arm at its end remote from the bill, and a link of said linkwork being pivoted at its end remote from the bill to a rotatable arm pivoted to said rotatable arm jointed to the armature link, said link of the linkwork being further connected to said armature link so as to be slidable longitudinally thereof so that the joint axes of both said links with said rotatable arms can be brought into or out of alignment, thereby unlocking or locking said armature in expanded position.

7. The combination of a collapsible top including a collapsible armature and a bill carried by said armature and movable relatively thereto with means forming an abutment for said bill when said top is fully extended, locking means respectively carried by the bill and the abutment and adapted for mutual locking engagement for fastening said bill onto said abutment in response to motion of the bill relatively to the armature, said locking means carried by the bill having a hook-shaped cross-section with the hook opening turned downwardly and rearwardly, the relationship between the armature and the bill movable relatively thereto being such that the motion of the bill with reference to the armature when said cooperating locking means are about to engage together has a substantial horizontal component directed from front to rear moving the locking means carried by the bill into such a spatial relationship with the locking means carried by the abutment that they lock the bill both vertically and horizontally.

8. The combination as in claim 7, wherein said hook-shaped locking means extend throughout the length of the bill and the cooperating locking means carried by the abutment consist in a bead extended along and throughout the length of the upper edge of said abutment.

9. In the combination of a collapsible top for a vehicle having a windshield including a collapsible armature and a bill carried by said armature and movable relatively thereto, actuating means for said top, with means at the top of the windshield forming an abutment for said bill when said top is fully extended, locking means respectively carried by the bill and the abutment and adapted for mutual locking engagement for fastening said bill onto said abutment in response to motion of the bill relatively to the armature, and with linkage means which interconnect the bill and actuating means adapted to move said bill relatively to the armature to thereby lock it onto and release it from said abutment, said latter means being operable while the armature is fully extended.

10. The combination as in claim 7 wherein said bill is pivoted to said armature, and said hook-shaped locking means are located forwardly of the locking means carried by the abutment and somewhat lower than the pivoting axis of the bill when about to engage the abutment.

11. In the combination of a collapsible top for a vehicle having a windshield including a collapsible armature, a flexible covering carried thereby, a bill carried by said armature movable relatively thereto and to which is attached the front end of said covering and actuating means for the top, with means at the top of the windshield forming an abutment for said bill when said top is fully extended, locking means respectively carried by the bill and the abutment and adapted for mutual locking engagement for fastening said bill onto said abutment, and linkage means which interconnect the bill and actuating means adapted to move said bill relatively to the armature, said latter means being operable while the armature is fully extended and at rest, so that said flexible covering is made taut by motion of said bill relatively to said collapsible armature while the latter is fully extended and at rest.

MAURICE BESSONNEAU.

REFERENCES CITED

The following references are of record in the file of this patent:

UNITED STATES PATENTS

| Number | Name | Date |
| --- | --- | --- |
| 1,127,574 | Anderson | Feb. 9, 1915 |
| 1,191,446 | McGregor | July 18, 1916 |
| 1,826,399 | Humer | Oct. 6, 1931 |
| 2,224,186 | Henri-Labourdette | Dec. 10, 1940 |
| 2,305,715 | Keller | Dec. 22, 1942 |
| 2,382,635 | Humer | Aug. 14, 1945 |

FOREIGN PATENTS

| Number | Country | Date |
| --- | --- | --- |
| 263,524 | Great Britain | Jan. 17, 1927 |
| 270,774 | Great Britain | May 16, 1927 |
| 501,078 | Great Britain | Feb. 21, 1939 |
| 515,539 | Great Britain | Dec. 7, 1939 |